United States Patent [19]

Carmi

[11] Patent Number: 5,311,593
[45] Date of Patent: May 10, 1994

[54] SECURITY SYSTEM FOR A NETWORK CONCENTRATOR

[75] Inventor: Ilan Carmi, Framingham, Mass.

[73] Assignee: Chipcom Corporation, Southborough, Mass.

[21] Appl. No.: 882,517

[22] Filed: May 13, 1992

[51] Int. Cl.⁵ .......................... H04K 1/00; H04L 9/02; H04Q 11/04
[52] U.S. Cl. ........................................ 380/23; 370/60; 370/85.15; 380/48
[58] Field of Search ...................... 380/23, 48; 370/60, 370/85.15

[56] References Cited

U.S. PATENT DOCUMENTS

| | | | |
|---|---|---|---|
| 4,901,348 | 2/1990 | Nichols et al. | 380/6 |
| 4,965,804 | 10/1990 | Trbovich et al. | 380/21 |
| 4,980,913 | 12/1990 | Skret | 380/23 |
| 5,177,788 | 1/1993 | Schanning et al. | 380/23 |
| 5,182,554 | 1/1993 | Kaiser et al. | 340/826 |

*Primary Examiner*—Stephen C. Buczinski
*Attorney, Agent, or Firm*—McGlew and Tuttle

[57] ABSTRACT

A method and apparatus for providing secure communication on open networks. Each port of the network is provided with a security entity which monitors the communication between one port to the other. End stations connected to the ports communicate with other end stations by transmitting data to the port and receiving data from the port. The data is sent out in data packets with a destination address and a source address. Each port has its own unique address. The security entity checks data packets coming into the port for a destination address. The destination address of incoming data packets is compared with the port address of the affiliated port. Also, outgoing data packets from an end station to a port are also monitored by the security entity. The security entity compares the destination and source address of the data packet with the affiliated port address. The security entity cyphers and decyphers a data portion of the data packet depending on whether or not the source address, destination address and port address match. In this way, end stations not destined to read the data portions are thus prevented from doing so. Also end stations which are not authorized to transmit onto the network are prevented from having any users on the network understand their data.

15 Claims, 9 Drawing Sheets

End Station

SECURITY SYSTEM FOR A NETWORK CONCENTRATOR

FIELD OF THE INVENTION

The present invention relates generally to open network systems and more particularly to a security system for an intelligent concentrator employed in an open network system to protect an end station link from eaves dropping intrusion, other security problems, and to protect a backbone connection link (of the network) from eaves dropping and other security problems.

BACKGROUND OF THE INVENTION

In the past, organizational computing has been provided in a main frame environment wherein security was implicitly enforced. All users shared a central resource. Access to the central resource was typically by a password and threats to security were posed mainly by password compromise. Solutions to such security problems typically included periodic password changes, audit trails and access restrictions based on user identity.

Open network systems have become prevalent and have been replacing main frames. However, with such a replacement, computing resources have become vulnerable to a myriad of new assaults. For example, the broadcast nature of the ETHERNET TM protocol makes it particularly susceptible to attack, since any attached device has the potential to examine all network traffic.

Solutions have been advanced with regard to such data transmission security. U.S. Pat. No. 4,901,348 to Nichols et al, discloses an arrangement for securing data transmission to and from one data device from among a plurality of data devices sharing a common interface. The patent discloses a master communication bus connected to a plurality of data transmitting and receiving devices via a single interface. Circuitry is provided in the common interface which generates a jamming signal to all devices connected to the interface except for that one device which is either transmitting or receiving a data-transmission. This jamming signal inhibits all the connected devices for monitoring and detecting the data transmission process of the interface. In this way, the one transmitting and receiving device is enabled to either transmit or receive data during the generation of the jamming signal which ensures a secure data transmission and prevents eaves dropping by the other devices. This jamming signal is then removed at the conclusion of the data transmission to or from the device.

Such an arrangement which relies on a jamming signal has significant drawbacks and limitations. Such system which rely on jamming signals do not address problems with regard to the security or backbone links. Further, such system only are useful for multi-drop bus topology and are not effective for ring topologies.

SUMMARY AND OBJECTS OF THE INVENTION

It is an object of the invention to provide a security system or security features for an intelligent concentrator or common connection entity or an open network system wherein security is provided to avoid eaves dropping of the end station link and also to prevent eaves dropping of the backbone connection link (hub to hub or hub to bridge link).

It is a further object of the invention to provide network access control or to provide for a limiting of access of the network only to authorized network devices. The invention sets out to provide network access control with hardware or software features, operating procedures, management procedures and various combinations of these features designed to detect and prevent unauthorized access and permit authorized access to the network. The invention has the object of providing an intelligent hub wherein the access is controlled by enabling or disabling ports. This feature requires a provision of one-to-one mapping of authorized stations based on their address (or any other criteria) to a set of ports in the hub. The appearance of packets with an unauthorized address on the port input will identify such violations. A "last address" capability is incorporated providing a basis for recognizing packets with an unauthorized address on the port input for an ETHERNET TM application. For FDDI (Fiber optic Data Distribution Interface) and TRN (Token Ring Network), a ring map capability may be used to map the address into the physical ports and provide a similar access control mechanism.

It is a further objection of the invention to prevent eaves dropping or to prevent the unauthorized use of a network device (or port) to prevent listening or capturing network traffic. As an example of such unauthorized use, a network analyzer may be attached to a network such as to an ethernet drop for storing all traffic on the network. This tool is typically used in debugging network problems. However, such a tool may also allow foes to trace all users conversations, capture clear text data, thereby providing a wire tap into the network.

Still another objection of the invention is the prevention of intrusion into the network or the prevention of unauthorized use of a network device (or port) to transmit network data. An example of such intrusion is the breaking of an FDDI ring, and attaching a work station or network analyzer. In a small network, such intrusion will normally be noticed. However, in larger networks, a foe may effect such an intrusion without the knowledge of the network manager (such as a logical management device).

Another object of the invention is to provide a security system which prevents spoofing or prevents the unauthorized use of a network device to assume the identity of an authorized network device, to listen and transmit network traffic. An example of such spoofing is using a network analyzer, and changing the source address to generate traffic posing as another network device. In this manner, a foe may conduct a conversation with a legitimate user and receive sensitive information.

It is a further object of the invention to provide a security system which allows for a security user group or a predefined closed group of network users to share the same level of security clearance. Such a security group feature may provide for a group of users to communicate among themselves in a secure fashion, over an open network system. The data that is exchanged between such a security user group is hidden from the rest of the network users.

It is still a further object of the invention to provide a security system, for a concentrator or common interface element of an open network system, which provides a consistent approach for handling all of FDDI, token ring and ETHERNET TM networks wherein the consistent approach provides a rich set of security options that may be implemented to address different implementation needs.

The present invention provides a plurality of end stations and connects these end stations to affiliated ports of a concentrator. Each of these ports is assigned a unique and affiliated port address. The end stations communicate with each other by transferring data packets between the end stations and the concentrator. A data packet is sent from an end station to a concentrator and from the concentrator the data packet is then sent to another end station or possibly even many end stations. Each of the data packets has a destination address giving the port address where the data packet is to be sent and a source address corresponding to the port address of the end station that sent the data packet. Affiliated with each port are security entities which cypher and decypher the data packets as they are either received by or transmitted from each of the ports. The cyphering and decyphering is based on the affiliated port address of the security entity and the destination address and source address of the data packet.

Each security entity compares the affiliated port address with the destination address of incoming data packets. Also, the security entity compares the port address with the source address of data packets being transmitted from the end station to the port. Depending on the embodiment chosen, the security entity cyphers and decyphers the data portion of the data packet depending on whether or not the addresses in the data packet match the affiliated port addresses.

The security entity according to the invention is preferably a hardware or software system provided with the concentrator according to the invention. The precise encryption technique is not part of the invention but any encryption technique may be used with the device, method and system of the invention. For example, a popular encryption technique such as the United States Data Encryption Standard, established in 1977 by the National Security Agency, may be used and the RSA encryption standard may also be used. Other encryption techniques may be used. The invention preferably contemplates a system wherein the encryption key may be changed at the concentrator.

In one embodiment, data portions of the incoming data packet are cyphered if the destination address does not match the affiliated port address and the data portion of an outgoing data packet is decyphered if the source address of the outgoing data packet does not match the affiliated port address.

A second embodiment cyphers a data portion of the outgoing data packet if the source address of the outgoing data packet matches the affiliated port address and decyphers a data portion of an incoming data packet if the destination address of the incoming data packet matches the affiliated port address.

A third embodiment is a combination of the previous two embodiments.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
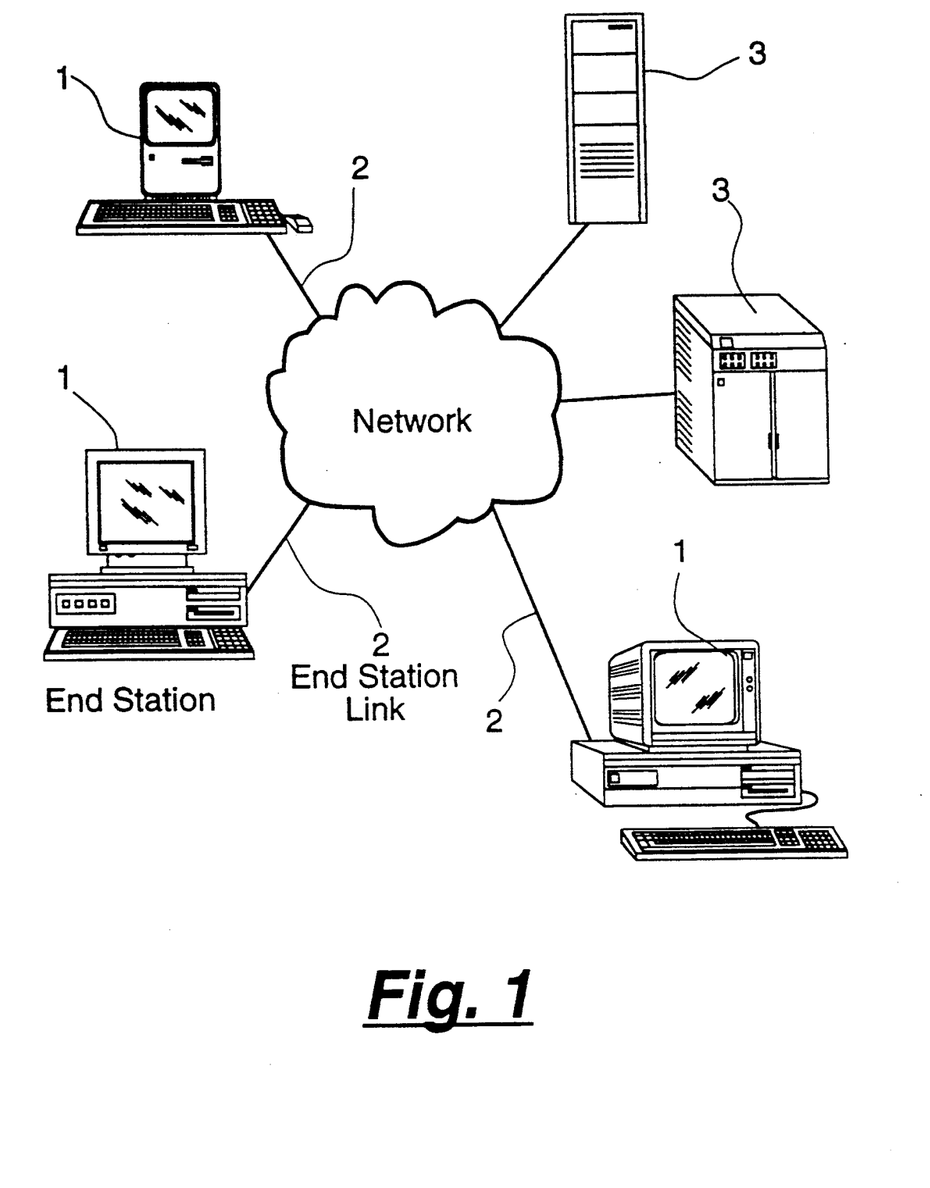
FIG. 1 is a schematic diagram depicting a non-specified open network system showing link connections.
Figure 2:
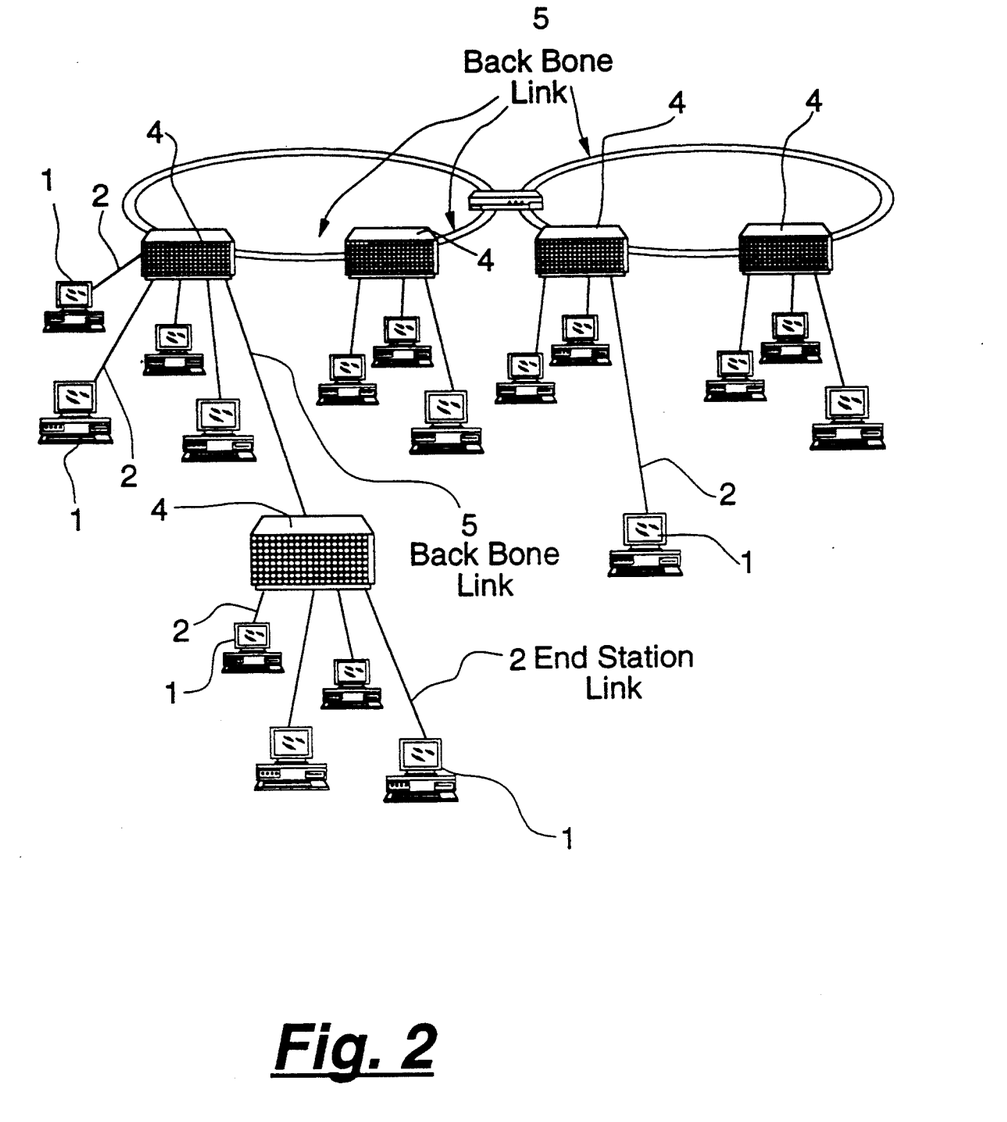
FIG. 2 is a schematic diagram depicting a wiring layout for an FDDI or token ring network employing a concentrator with a security entity or security system according to the invention.

Referring to the drawings and in particular to FIG. 1, FIG. 1 discloses an open network system with end stations 1 connected to the network by end station links 2. The end stations 1 can communicate through the network, between themselves or between other peripheral devices 3. The network is implemented by concentrators such as a concentrator 4 (FIG. 2) which controls and maintains the communication on the network. Concentrators 4 can communicate with other concentrators and the networks that the other concentrators 4 manage. This communication between concentrators 4 is performed over a backbone link 5 which provides a communication path between the concentrators 4. This backbone link 5 allows the end stations 1 of one network to communicate with the end stations 1 of another network. The backbone link 5 and the connections between concentrators 4 and end stations 1 of various networks are shown in FIG. 2.

Figure 3:
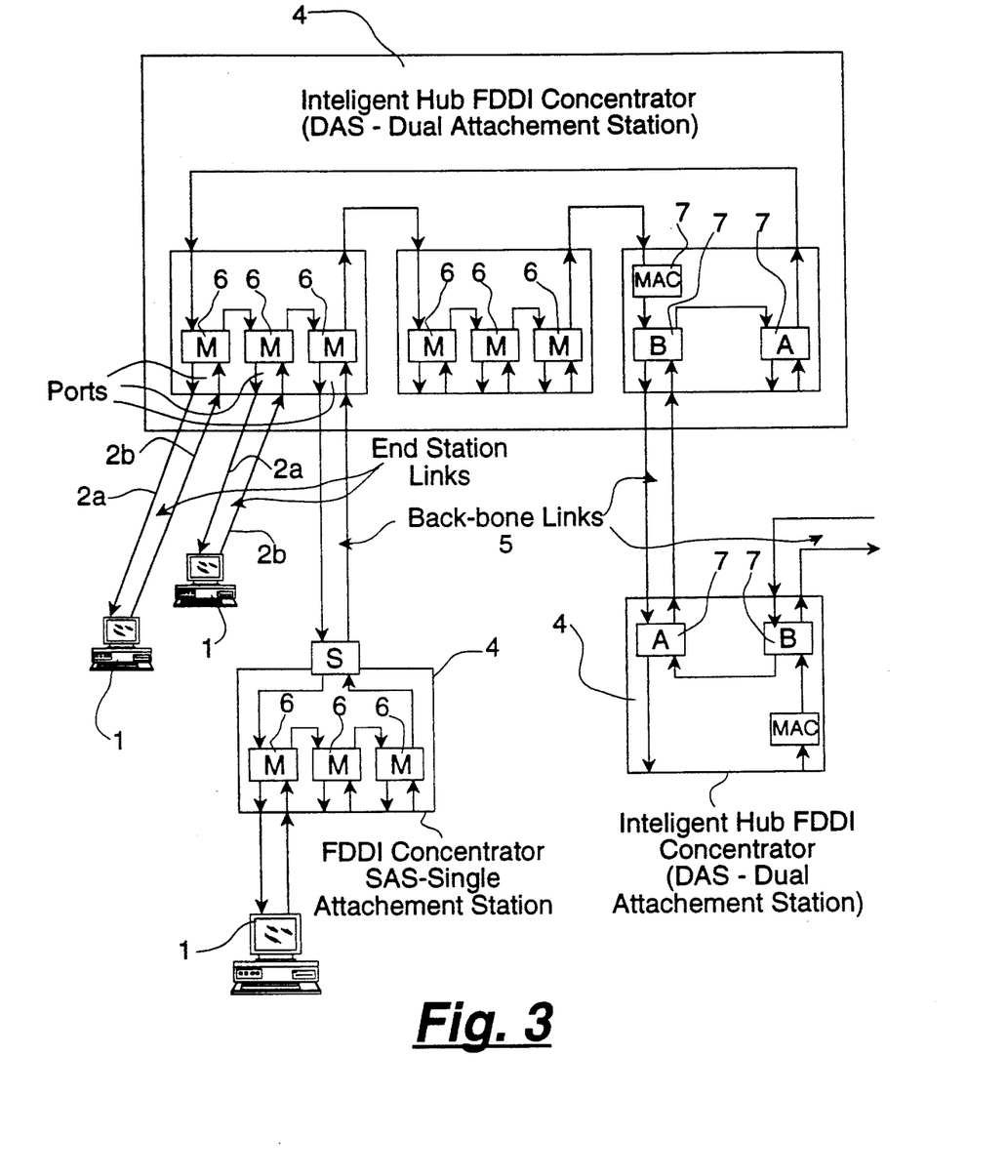
FIG. 3 is a schematic diagram providing a simplistic description of the data path in an FDDI network (and token ring network) showing the ring topology.

Each concentrator 4 has ports 6 (FIG. 3). The end stations 1 are connected via the end station links 2 (each link preferably formed of transmit and receive data links 2a, 2b respectively) through ports 6 to the concentrator 4. Each end station 1 has its own port 6 to which it is connected. The concentrators 4 can also have backbone ports 7 set for communicating with other concentrators over the backbone links 5. The ports 6 and 7 in the concentrator 4 transmit and receive data to and from the end stations 1 and backbone links 5, respectively. In a ring topology, data received from one port 6 is transmitted to a next port 6. This next port 6 then receives the data and transmits it to the end station 1. The end station 1 receives the data and checks a designation address on the data to see if the data is destined for that end station 1. If the data is not destined for that end station, the end station transmits the data back to the port. The port then transmits the data to the next port and the process is repeated. In this manner, a ring is formed by the last port in the order then sending data to the first port (which initiated the transmission).

Figure 4:
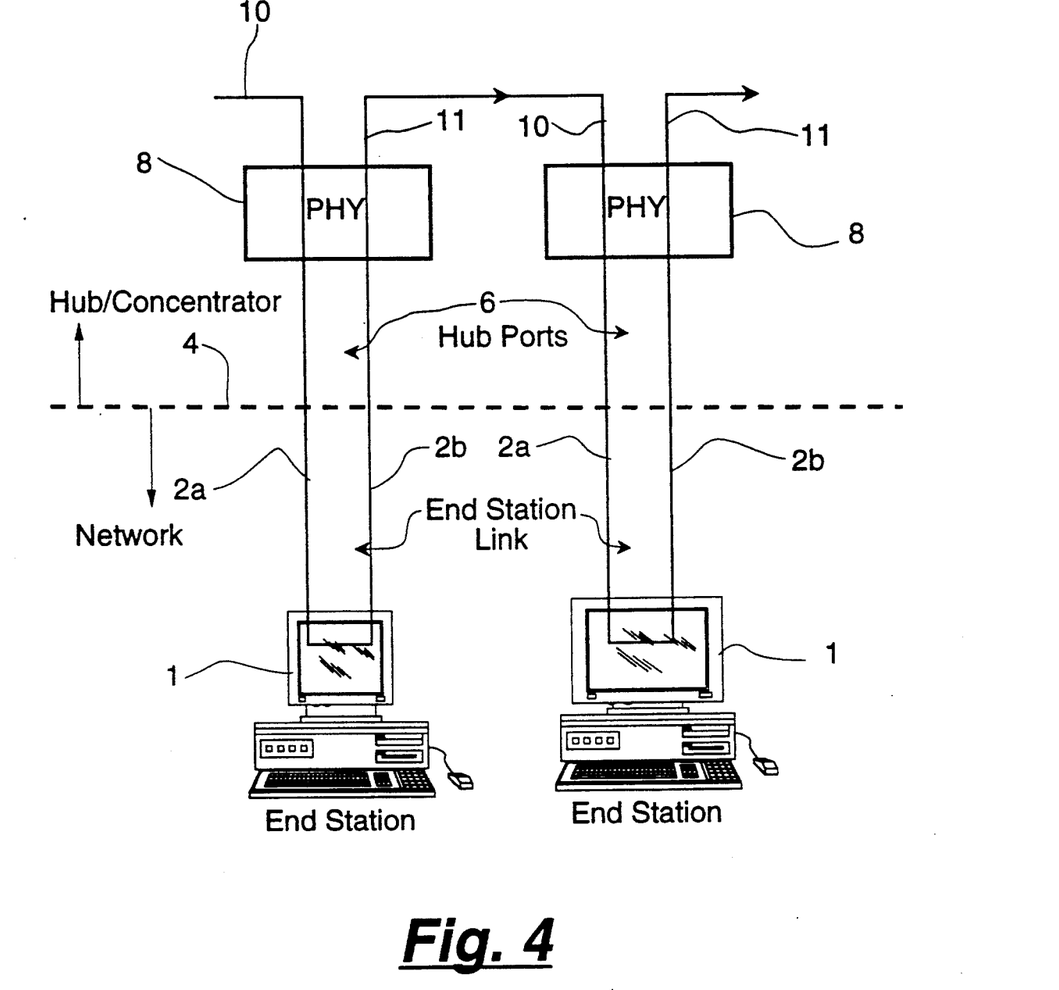
FIG. 4 is a schematic diagram showing how data flows through the hub (in this case both for FDDI and token ring), showing an end station link and end station in a ring network employing the intelligent hub concentrator according to the invention.

As shown in FIG. 4, each port has a physical layer 8 which performs the operations needed in receiving data from other ports, transmitting data to an end station 1, receiving data from an end station 1 and transmitting data to another port. A physical layer is preferably positioned, for example, for receiving a serial stream from a port and the physical layer converts the serial stream of bits to a parallel stream of bites. Such a physical layer may also change one clock domain to another for information to be sent on the backplane bus.

According to the invention, a security entities 9 are provided associated with each of the concentrators 4 wherein a security entity 9 is provided at each port. The security entity 9 provides for encryption of data according to the logic as specified below. The exact encryption technique used is not a feature of the invention and standard encryption techniques may be used such as the Data Encryption Standard (DES) or RSA (an encryption format widely adopted for business use). Other encryption techniques may be used and the invention contemplates the ability to change the encryption key (by downloading to the security entity) at the concentrator such that numerous and random changes may be provided. The invention particularly contemplates the security entities for various ports of a network, connected through a concentrator, to be present at the concentrator. An arrangement may be provided for changing the cypher or encryption key either for each port wherein various ports may use different encryption keys (this is only possible for the first embodiment and part of the third embodiment as described below) or the cypher or encryption technique may be changed for all ports of the given concentrator.

The security entity preferably includes a gate array wherein different keys may be downloaded. The key distribution is not a part of the present invention and is not described in detail. However, this may be a mechanism wherein a management hub of the concentrator writes the key to the security entity.

Figure 5:
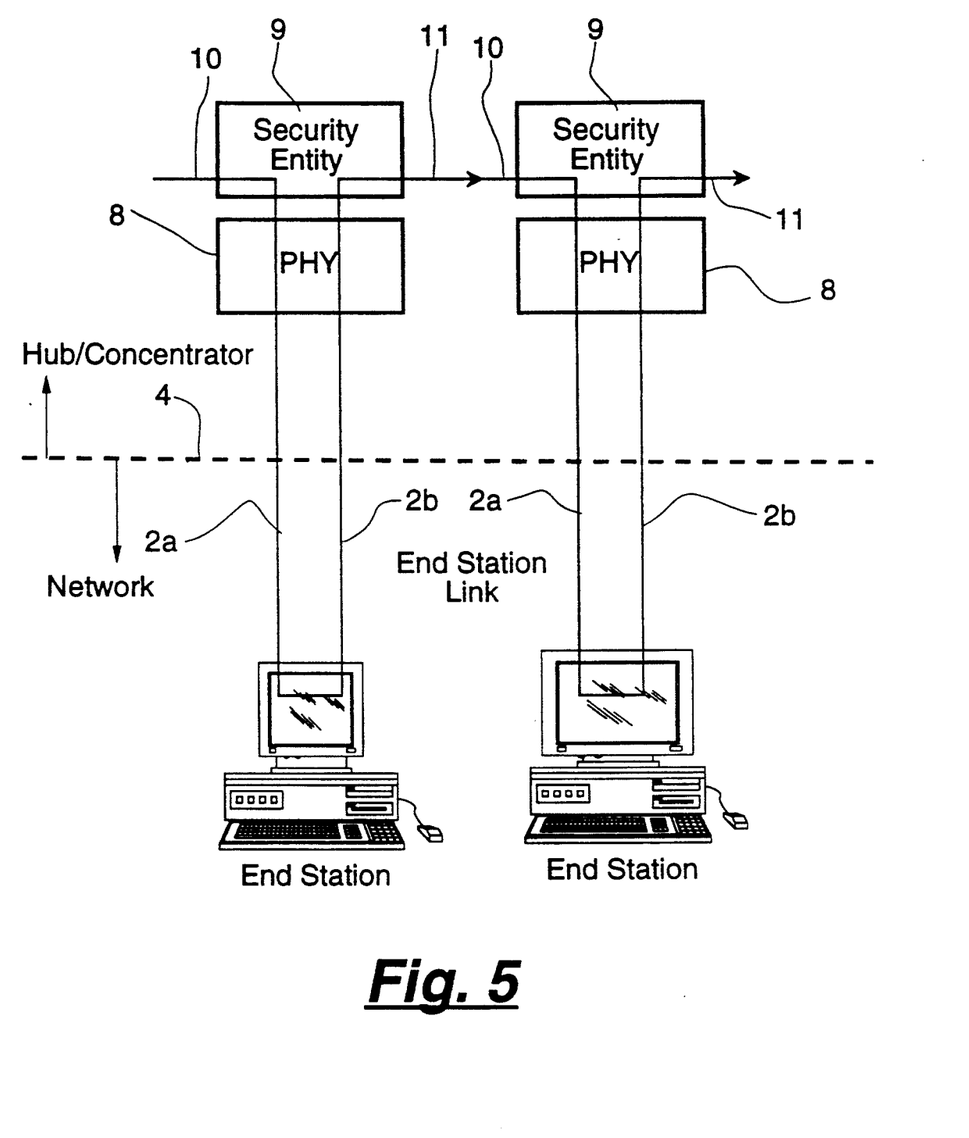
FIG. 5 is a schematic view similar to FIG. 4 showing the security entity according to the invention employed in the intelligent hub concentrator.

FIG. 5 shows security entities 9 connected to the physical layers 8. These security entities 9 intercept data flowing between the physical layers 8. The embodiment shown in FIG. 5 depicts the security entity 9 above the physical layer 8 (i.e. between the backplane bus and the physical layer 8). However, according to the invention, such security entity 9 may be provided below the physical layer 8 (i.e., between the physical layer 8 and the port).

Figure 6:
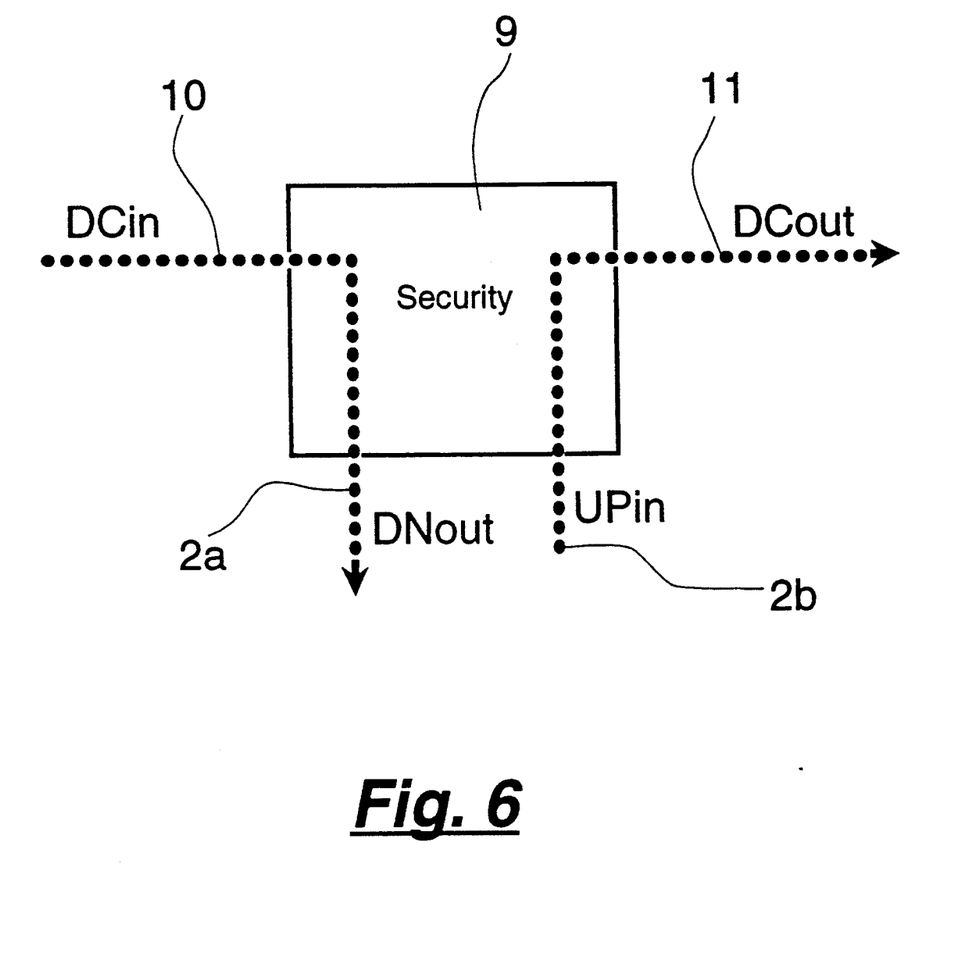
FIG. 6 is a schematic diagram showing the input and output, into and out of, the security entity according to the invention.

The path 10 bringing data into the security entity 9 from a previous port is called DCin (daisy chain input) 10. The data input then goes into the security entity 9 through DCin 10 and then exits the security entity 9 through DNout (down stream output) 2a. DNout 2a is part of the end station link 2 which carries the data to the end station 1. When the end station 1 transmits data to the port 6, the data travels along the path UPin (up stream input) 2b. The security entity 9 receives the data from end station 1 on UPin 2b and then sends this data out to the next port on path DCout (downstream outputs) 11 (see FIG. 6).

The security entity 9 has the ability to cypher and decypher (encrypt and deencrypt) data which passes through the security entity 9. In one embodiment of the present invention, the security entity checks a destination address of a data packet coming in on path DCin 10. If the destination address does not match the address of the port affiliated with the security entity 9, the security entity 9 then cyphers the data portion of the data packet before transmitting the data packet to the end station 1. The end station 1 then receives the data packet and is able to read and understand the destination address and other control information in the data packet but will be unable to understand the information contained in the data packet. When the data packet is sent back to the port along path UPin 2b, the security entity 9 checks the source address on the data packet. If the source address of the data packet does not match the address of the port affiliated with the security entity 9, the security entity 9 then decyphers the data portion of the data packet and then transmits the entire data packet onto the path DCout 11. This process is then repeated for each security entity 9 connected to each port that the data packet passes through. It is also possible for the security entity 9 to check both the destination address and the source address during the DCin-DNout transition and the UPin-DCout transition. If neither of the addresses match the address of the port, the security entity 9 cyphers or encrypts the data portion during the DCin-DNout transition and decyphers the data portion during the UPin-DCout transition. The security entity's ability to encrypt only a portion of the data stream, that is, not encrypt the packet headers and the like, is easily effected depending upon the system or protocol used. Standards such as 802.5 and ANSI X3T 9.5 describe data packet formats. The person of ordinary knowledge in the networking art would necessarily appreciate such packet headers and the like may be distinguished from a data stream which is to be encrypted.

In a FDDI (fiber optic data distribution interface) and TRN (token rink network) a ring topology is used. At the end of the normal FDDI or token-ring link establishment (FDDI SMT-connection management "CMT") the security entity 9 will become active. The security option is activated only when enabled. The security entity 9 monitors the data coming in through DCin 10. Detection of a packet header initiates frame control (FC) field screening and will determine the packet type.

The security entity 9 forwards all packets other than individually addressed LLC (logic link control) packets unchanged to DNout 2a. The transmitter connected to that port will later transmit these packets to the end station 1. That means that all broadcasts, multicasts and special packets will not be effected by the security entity 9 (again the various standards define such special packets such that the may be distinguished for practice of the invention). The security entity preserves Frame Control, Destination Address and Source Address (moreover other MAC level field) in all cases. The security entity 9 also preserves source routing information and other required field of the data packet.

The security entity 9 further processes the LLC packets and compares the DA (Destination Address) against the programmed authorized address. The security entity then cyphers the packets in all cases other than a match using a programmed cypher key. The security entity 9 passes packets unmodified to DNout 2a only when an authorized address appears in the destination address of the data packet. The port 6 transmits these packets to the end station 1 connected to that port. In this way an individual end station 1 is able to understand only data packets destined to that end station.

The logic for the above described security entity can be defined by the following formula.

Performed on DCin-to-DNout (Only for individually addressed packets)
if (DA≠Port Addr) and (SA≠Port addr) then cypher
where:
DA—Destination Address
SA—Source Address
≠—Not Equal Packets received from the end station 1 connected to that port through UPin 2b will go through a similar screening. On detection of a packet header the security entity 9 checks the Frame Control (FC) field and determines the packet type. It then forwards all packets other than individually addressed LLC packets unchanged to DCout 11. The security entity 9 transfers these packets to the next PHY 8 or security entity 9 in the daisy chain.

As before, the security entity 9 further processes the LLC packets and compares the DA (Destination Address) against the programmed authorized address. In all cases other than a match it decyphers the packets using the programmed cypher key. Only packets with the authorized destination address will pass untouched to DCout 11. After all this it will forward these packets to the next PHY 8 or security entity 9.

It is pointed out that both the cyphering or encryption and decyphering or deencryption will be executed at the same physical location. In such a case the cypher key may change as frequently as required, increasing the security level protection and reducing the requirement for the complexity of the encryption algorithm. This also limits the cypher key distribution.

This algorithm will protect the network from intruders. It provides a solution when dealing with the case that the end station 1 connected to the port is originating the packets received on UPin 2b. Packets with a Source Address (SA) identical to the authorized address for that port will always pass unchanged from UPin 2b to DCout 11. The security entity 9 decyphers the packets in the case that an unauthorized end station 4 with a Source Address other than the one authorized to generate packets into that port tries to transmit onto the network. This action will trash the content of these packets since the security entity 9 did not encrypt the data packet in the first place. The security entity 9 will scramble the data content of the packet only but still maintain the validity of the data packet.

The logic of the security entity of the system described immediately above can be defined by the following logic terms:

Performed on UPin-DCout (only for individually addressed packets)
if (DA≠Port Addr) and (SA≠Port Addr) than Decypher The security entity a must process the CRC properly. It checks the CRC when it receives the packet on the DCin 10 and recalculate it when it sends it down on the DNout 2a. It processes the CRC similarly when it receives the packet on the UPin 2b and sends it on DCout 11. The reason for such a mechanism is that in all situations CRC should be valid for a normal FDDI network operation. This Mechanism should also detect a CRC error and preserve the error so it will not bury errors.

Regarding the Source routing, this mechanism detects a packet with a Source Routing Information (RI) field (using source address most significant bit) and preserves the Routing Information without change.

Security User Group

In another embodiment of the present invention, called a security user group, the security entity 9 performs its cyphering and decyphering in a slightly different manner. When the security entity 9 receives a data packet from an end station 1 where the source address is equal to the port address, the security entity 9 then cyphers the data portion of the data packet. The data packet then gets transmitted around the ring in the usual manner. When a security entity 9 receives a data packet on DCin 10, the security entity 9 checks the destination address of the data packet. If the destination address equals the port address, the security entity then decyphers the data portion of the data packet and transmits the data packet to DNout 2a for use by the end station 1.

If the security entity 9 receives a data packet, and the destination address does not match the port address, the data packet can be passed through unmodified. Likewise, if the security entity 9 receives a data packet on the path Upin 2b where the source address does not match the port address, the data packet can be transmitted to DCout 11 also unmodified.

Figure 7:
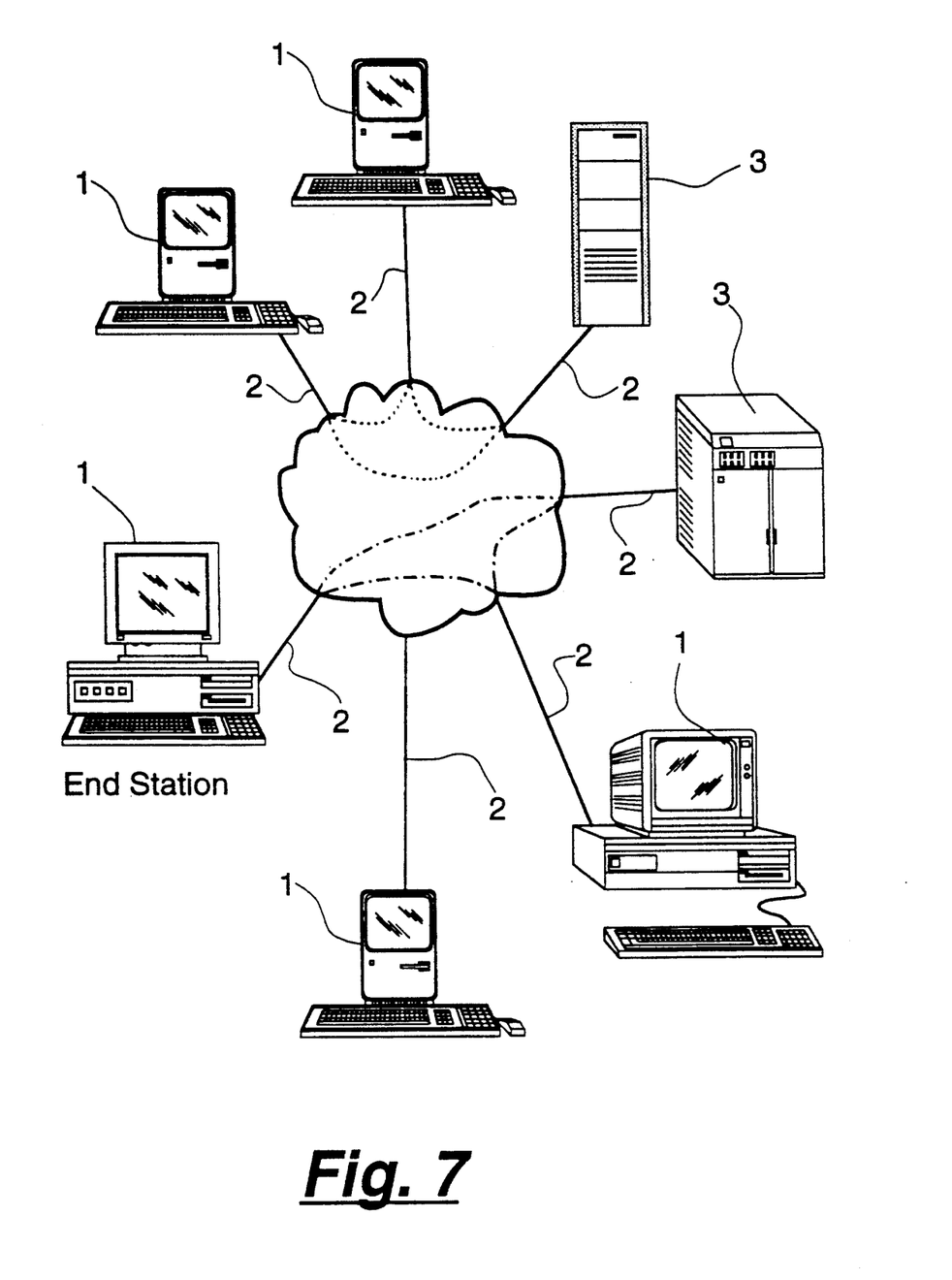
FIG. 7 is a schematic diagram illustrating the security user group feature according to the security system of the invention.
Figure 8:
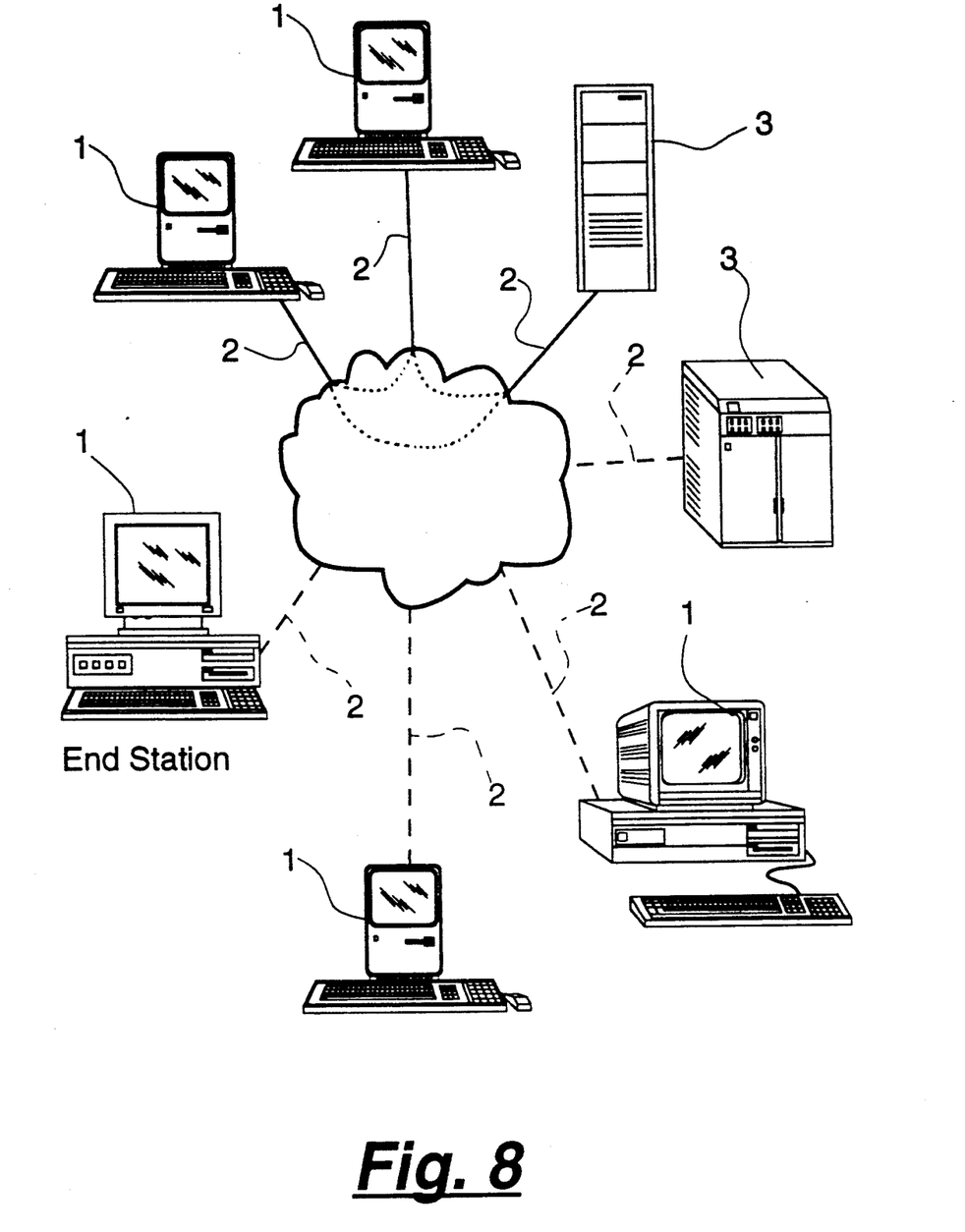
FIG. 8 is a schematic diagram similar to FIG. 7, illustrating the multi-level security system according to the invention.

In this embodiment, the data is cyphered as soon as it enters the network and the data packet is only decyphered once it reaches its destination port. All end stations in between the source address and the destination address will not be able to understand the data portion since it will be cyphered or encrypted. FIG. 7 shows that the data in the network is effectively hidden from non-participating end stations, from the time it enters the network to the time it leaves the network at its destination address. The data portion of the data packet can be thought of as going straight from the source address to the destination address without further cyphering or decyphering.

The logic for this embodiment is shown in the following formulas:
Performed on UPin-to-DCout (only for individually addressed packets) if (DA=Port Addr) or (SA=Port addr) then cypher
Performed on DCin-to-DNout (only for individually addressed packets) if (DA=Port Addr) and (SA=Port addr) then Decypher Multi-Level Security A third embodiment of the present invention is called multi-level security. This embodiment is a combination of the previous two embodiments. It allows the creation of security user groups while the remaining users can still be protected by an eaves dropping and an intrusion protection mechanism. In this embodiment two different cypherings of the data portion are possible. When the security entity 9 receives a data packet on path UPin 2b, the security entity 9 checks the source address. If the source address equals the port address then the security entity 9 cyphers the data portion. The data packet is then sent to the next security entity 9 for the next port 6. The security entity receiving a data packet checks the destination address to determine if it matches the port address of the port affiliated with the security entity 9. If the destination address does not match the port address, the security entity 9 cyphers the data portion one more time. The data packet is then put on path DNout 2a and sent to the end station 1. The end station 1 reads the data packet but will not be able to understand the data portion. The end station 1 then sends the data packet back to the security entity 9 on path UPin 2b and the security entity 9 checks to see if the source address matches the port address. If the source address does not match the port address, the security entity 9 decyphers the data portion and returns the data portion to the same form it was in before it entered the security entity 9. The data packet then gets sent to the next security entity 9. This continues happening until the data packet reaches the security entity of the destined port. If the destination address matches the port address, the security entity 9 then decyphers the data portion which was originally cyphered by the source address security entity. This then puts the data portion in the original understandable format which can be used by the end station at the destination address.

With this embodiment, all users of the network can take advantage of security features against intruders into the network. Also, a group of users in the network can isolate themselves from the remaining users of the network. The logic of this embodiment is described in the following formulas:

Performed on UPin-to-DCout (only for individually addressed packets)
if (DA = Port Addr) or SA = (Port addr) then Cypher
if (DA≠Port Addr) and (SA≠Port addr) then Decypher
Performed on DCin-to-DNout (only for individually addressed packets)
if (DA = Port Addr) or (SA = Port addr) then Decypher
if (DA≠Port Addr) and (SA≠Port addr) then Cypher

Trunk (Backbone) Link

The trunk link (the link between hubs) is fully protected when the security group option is used. In the case of the first embodiment, the eaves dropping security option, the data will travel unprotected on such links.

Obviously, this type of link is less accessible then the end station link 2. It is quite possible with this invention to protect this trunk/backbone link 5 with cyphering and decyphering on both sides of the trunk/backbone link 5. The security entity 9 on backbone port 7 on both sides of the trunk/backbone link will cypher all packets upon transmission onto the link and decypher them when the data packets are received from the trunk-/backbone link. Cyphering is a subset of the security entity capabilities and therefore adding this feature to the trunk/backbone links is very advantageous.

Ethernet (Multi-drop Topology)

Figure 9:
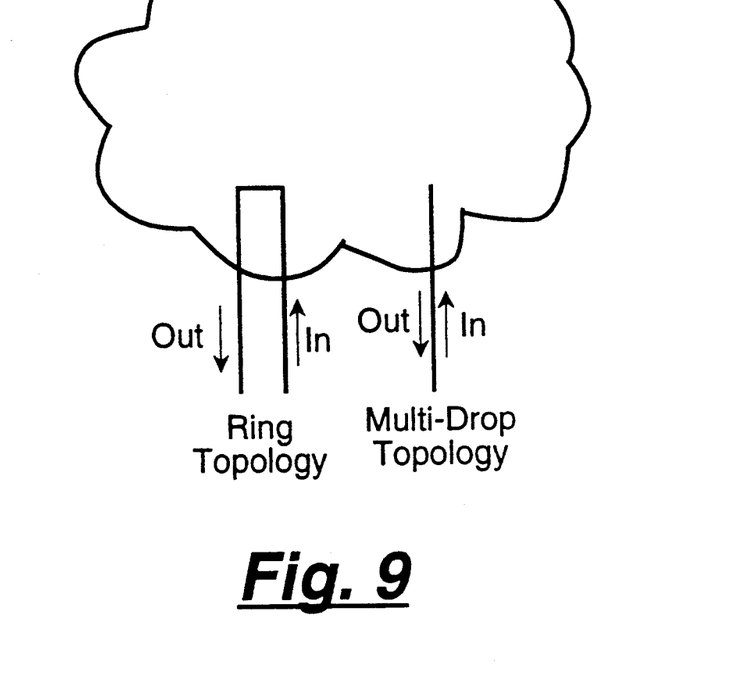
FIG. 9 is a schematic diagram showing the use of the security system of the invention for both ring topology and multi-drop topology.

This embodiment is designed to address both ring topology and multi-drop (bus) topology. While the present invention has addressed ring topology networks in depth, the present invention can also be applied to multi-drop (bus) topology also. In the case of an ETHERNET (multi-drop topology), the end station link 2 can be treated as a full duplex link instead of a lobe (ring). The invention, its logic formulas and algorithms can be applied as previously defined. A comparison of the end station links in ring topology and multi-drop topology is shown in FIG. 9.

While specific embodiments of the invention have been shown and described in detail to illustrate the application of the principles of the invention, it will be understood that the invention may be embodied otherwise without departing from such principles.

What is claimed is:

1. A secure communication network comprising:
a plurality of end stations;
a plurality of end station link means for providing a communication path to and from each of said plurality of said end stations;
concentrator means for connecting said plurality of end station link means and for transferring data packets between said plurality of end stations, said concentrator means having a plurality of ports, each of said plurality of ports having a unique affiliated port address, each of said plurality of ports being affiliated with a specific one of said plurality of end stations and end station link means said concentrator means receiving a data packet from one end station of said plurality of end stations through an affiliated port of said one end station, and then transmitting the data packet through affiliated ports of other end stations to said other end stations, the data packet having a destination address, a source address and a data portion; and
a plurality of security means for cyphering and decyphering said data packet passing into and out of each of said ports based on a comparison of said destination address and said source address with said affiliated port address of said each port, each of said plurality of said security means being affiliated with a port of said concentrator.

2. A network in accordance with claim 1, wherein:
each of said plurality of security means compares said affiliated port address with said destination address of an incoming data packet of an affiliated port, said each security means cyphering a data portion of said incoming data packet if said destination address does not match said affiliated port address, said each security means also comparing said affiliated port address with a source address of an outgoing data packet received from said affiliated end station, said each security means decyphering a data portion of said outgoing data packet if said source address of said outgoing data packet does not match said port address of said affiliated port.

3. A network in accordance with claim 1, wherein:
each of said security means compares said affiliated port address with a source address of an outgoing data packet from said affiliated end station, said each security means cyphering a data portion of said outgoing data packet if said source address matches said affiliated port address, said each security means comparing said affiliated port address with a destination address of an incoming data packet for said affiliated port, said security means decyphering a data portion of said incoming data packet if said destination address of said incoming data packet matches said affiliated port address.

4. A network in accordance with claim 3, wherein:
said security means delivers said outgoing data packet unmodified to another port if said source address does not match said affiliated port address; and
said security means transmits said incoming data packet unmodified to said affiliated end station if said destination address of said incoming data packet does not match said affiliated port address.

5. A network in accordance with claim 1, wherein:
each of said plurality of security means compares said affiliated port address with a destination address of an incoming data packet of an affiliated port, said each security means cyphering a data portion of said incoming data packet if said destination address does not match said affiliated port address, and said security means decyphering a data portion of said incoming data packet if said destination address of said incoming data packet matches said affiliated port address, said each security means also comparing said affiliated port address with a source address of an outgoing data packet received from said affiliated end station, said each security means decyphering a data portion of said outgoing data packet if said source address of said outgoing data packet does not match said port address of said affiliated port, and said each security means cyphering a data portion of said outgoing data packet if said source address matches said affiliated port address.

6. A network in accordance with claim 1, wherein: said concentrator means deliberately transmits the data packet to a port of an end station not authorized to receive the data packet.

7. A secured network communication method comprising the steps of:
providing a plurality of end stations;
connecting each of said end stations to an affiliated port of a plurality of ports of a concentrator, assigning each of said plurality of ports a unique affiliated port address;
communicating between said plurality of end stations by passing data packets from one of said plurality of end stations through an affiliated port of said one end station, and then transmitted a data packet through affiliated ports of other end stations to said other end stations;
assigning each of said data packets a destination address and a source address; and
cyphering and decyphering said data packets passing into and out of each of said ports based on a comparison of said destination address and said source address with said affiliated port address of said each port.

8. A method in accordance with claim 7, further comprising:
comparing a destination address of an incoming data packet for each port of said plurality of ports with said affiliated port address;
cyphering a data portion of said incoming data packet if said destination address of said incoming data packet does not match said affiliated port address;
comparing a source address of an outgoing data packet from each of said plurality of end stations with said affiliated port address; and
decyphering a data portion of said outgoing data packet if said source address of said outgoing data packet does not match said affiliated port address.

9. A method in accordance with claim 8, further comprising:

transferring said incoming data packet unmodified to said each port if said data address of said incoming data packet matches said affiliated port address; and
transferring said outgoing data packet unmodified to another port if said source address of said outgoing data packet matches said affiliated port address.

10. A method in accordance with claim 7, further comprising:
comparing a source address of an outgoing data packet from each of said plurality of end station with said affiliated port address;
cyphering a data portion of said outgoing data packet if said source address of said outgoing data packet matches said affiliated port address;
comparing a destination address of an incoming data packet for each of said plurality of ports with said affiliated port address; and
decyphering a data portion of said incoming data packet if said destination address of said incoming data packet matches said affiliated port address.

11. A method in accordance with claim 7, further comprising:
comparing a destination address of an incoming data packet for each port of said plurality of ports with an affiliated port address;
decyphering a data portion of said incoming data packet if said destination address of said incoming data packet matches said affiliated port address;
cyphering a data portion of said incoming data packet if said destination address of said incoming data packet does not match said affiliated port address;
comparing a source address of an outgoing data packet from each of said plurality of end stations with an affiliated port address;
decyphering a data portion of said outgoing data packet if said source address of said outgoing data packet does not match said affiliated port address; and
cyphering a data portion of said outgoing data packet if said source address of said outgoing data packet matches said affiliated port address.

12. A method in accordance with claim 7, wherein: the data packet is deliberately past through a port of an end station not authorized to receive the data packet.

13. A method in accordance with claim 7, wherein: the data packet is past into and out of successive ports of said plurality of end stations until reaching a destination end station.

14. A method in accordance with claim 7, wherein: the data packet is past in a token ring topology.

15. A method in accordance with claim 7, wherein: the data packet is past substantially simultaneously to said affiliated ports of said other end stations.

* * * * *